United States Patent [19]

Mitsuyama

[11] Patent Number: 4,935,088
[45] Date of Patent: Jun. 19, 1990

[54] METHOD OF MAKING A MULTI-POCKETED PAPER HOLDER

[76] Inventor: Masuhiro Mitsuyama, 1071, Kinugasa, Wake-cho, Wake-gun, Okayama, Japan

[21] Appl. No.: 175,245

[22] Filed: Mar. 30, 1988

[30] Foreign Application Priority Data

Dec. 4, 1987 [JP] Japan .................. 62-307941

[51] Int. Cl.$^5$ .................. B32B 31/20; B32B 31/26
[52] U.S. Cl. .................. 156/272.4; 156/273.9; 156/274.4; 156/288; 156/308.2; 156/308.4; 156/309.6; 156/323; 493/405
[58] Field of Search .................. 156/81, 90, 204, 227, 156/272.2, 272.4, 294.4, 285, 288, 303.1, 308.2, 308.4, 309.6, 309.9, 323, 322, 379.7, 273.9, 274.2, 380.6–380.8, 556, 559; 493/405; 206/256, 274, 554, 803, 507

[56] References Cited

U.S. PATENT DOCUMENTS

| | | | |
|---|---|---|---|
| 1,993,254 | 3/1935 | Booth | 156/288 |
| 2,669,279 | 2/1954 | Barter | 156/288 |
| 2,951,002 | 8/1960 | Ruscito | 156/288 |
| 3,367,819 | 2/1968 | Schlag | 156/227 |
| 3,932,250 | 6/1976 | Sato | 156/323 |
| 4,053,671 | 10/1977 | Carlisle | 156/308.4 |
| 4,668,729 | 5/1987 | Kataoka | 156/323 |

Primary Examiner—Merrell C. Cashion, Jr.
Attorney, Agent, or Firm—Wenderoth, Lind & Ponack

[57] ABSTRACT

This invention concerns a production process for a multi-pocketed paper holder comprising a plurality of component pockets sandwiched between a pair of covers. The back of the covers and a component pocket next thereto, and each pocket in contact between the covers are fused in a bellows form by the heat from a high frequency heating apparatus. The back of the covers is provided with a pocket to hold an electroconductive plate by the use of a fusible synthetic polymer sheet, while the component pockets, in which either an electroconductive or non-electroconductive plate is placed, are formed by the use of two sheets of fusible synthetic polymer by fusing three sides thereof with one side left open. A pile of parts is formed by superimposing a component pocket holding an electroconductive plate and component pockets holding a non-electroconductive plate and the covers holding an electroconductive plate, and these are heated between a bed and a compressing plate opposing each other by means of a high frequency heating apparatus so that the product is finished by fusing the components to each other.

8 Claims, 6 Drawing Sheets

METHOD OF MAKING A MULTI-POCKETED PAPER HOLDER

BACKGROUND OF THE INVENTION

This invention relates to a production process for a multi-pocketed paper holder. More particularly, it relates to a process for producing a multi-pocketed paper holder by fusing the edges of the contacting face of component pockets positioned between a pair of covers by the use of a high frequency heating apparatus.

A paper holder with covers that has many pockets therebetween, each having a mouth opening on one side, is convenient for keeping miscellaneous articles because of its versatility.

Hitherto, in order to manufacture a paper holder of this type, first one pocket is fused to the back of a cover by means of a high frequency heating apparatus, and then a certain number of other similar pockets have to be fused similarly to the preceding pocket one after the other to the last, to which the other cover is fused. Therefore, the problem in such a conventional production process for a paper holder is that it takes too much time and trouble because of repeating the same cycles of fusing the pockets, which eventually has made the process unsuitable for mass production on account of its poor working efficiency.

Besides, with such a process, a cover made out of a single sheet of synthetic polymer is scarred by the high frequency heating, so that the appearance of the product and the merchandise value thereof is significantly reduced by heating scars.

OBJECTS OF THE INVENTION

It is a first object of this invention to provide a production process for a multi-pocketed paper holder with a pair of covers that can be manufactured so efficiently as to be suitable for commercial-scale mass production. It is a second object of this invention to provide a production process for a multi-pocketed paper holder with a pair of covers that can supply the product at the lowest cost by the use of mass production. It is a third object of this invention to provide a production process for a multi-pocketed paper holder with a pair of covers that enables manufacturers to provide an inexpensive and competitive product to the market by virtue of the mass production method. It is a fourth object of this invention to provide a production process for a multi-pocketed paper holder with a pair of covers according to which no scars due to the high frequency heating appear on the covers. The above and other objects and features of this invention will appear more fully hereinafter from a consideration of the following description taken in connection with the accompanying drawings wherein one embodiment is illustrated by way of example.

DETAILED DESCRIPTION OF THE INVENTION

Figure 3:
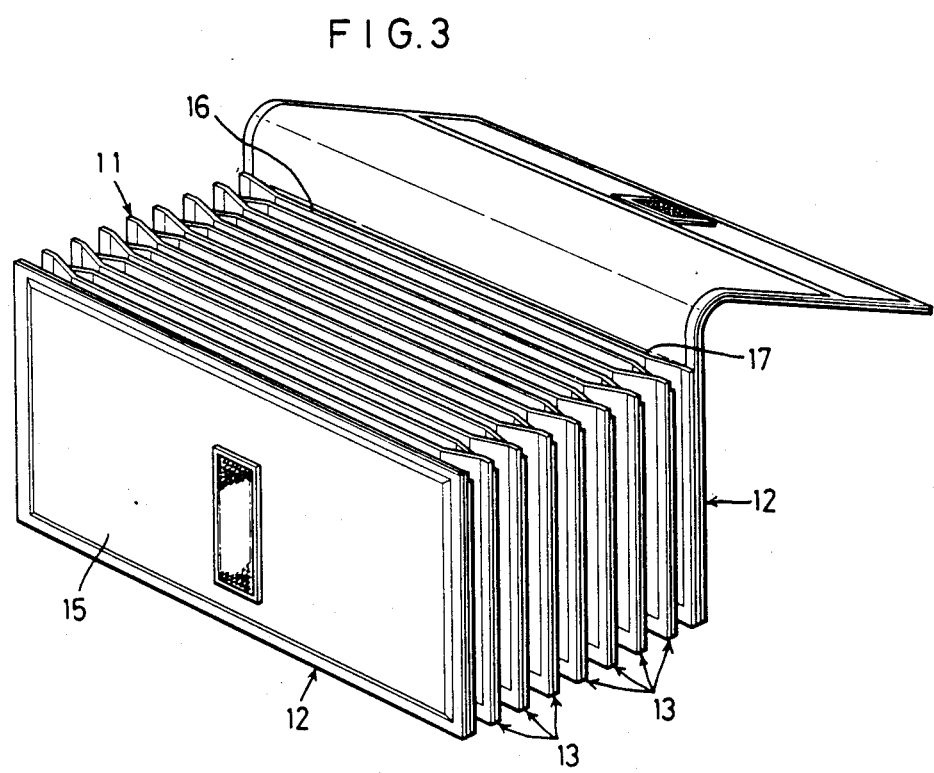
FIG. 3 is a perspective view of a finished multi-pocketed paper holder made according to the process of this invention.

As shown in FIG. 3, a paper holder 11 made by the process of this invention is constructed essentially of a pair of covers 12 and a plurality of component pockets 13; more particularly, a plurality of component pockets 13 are fused to each other, and a cover 12 is fused on both the outsides thereof respectively.

Figure 2:
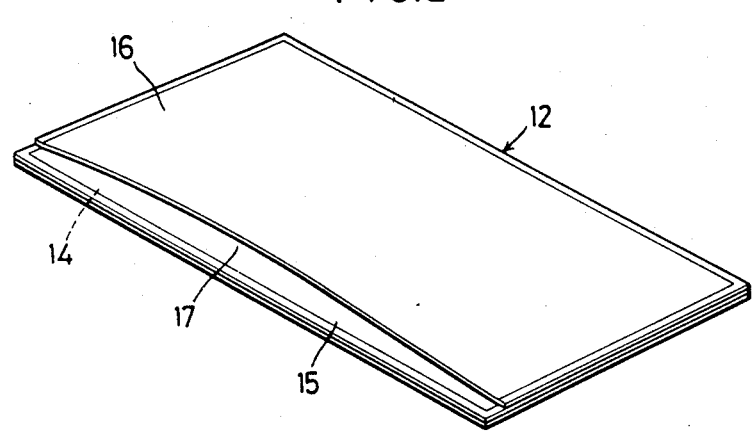
FIG. 2 is a perspective view of a cover used in the process of this invention.
Figure 5:
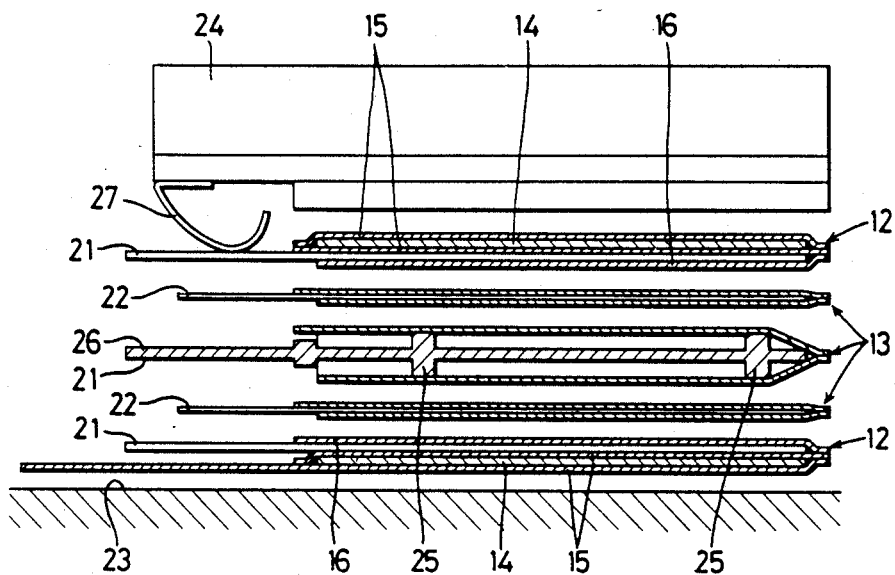
FIG. 5 is a cross-sectional elevational view illustrating a production process for a multi-pocketed paper holder according to this invention.

The cover 12, as shown in FIG. 2 or 5, is formed by wrapping a rectangular interlining 14, made of cardboard for example, with a sheet 15 of thermofusible synthetic polymer. Another sheet of thermofusible synthetic polymer 16 has the edges fused to the back of the cover 12 in such a way that one side is left open so as to form a pocket 17. The sheet 16 serves as an intermediate member for combing a pile of component pockets 13 to the cover 12. Also, the sheet 16 is provided on the back of the cover 12 to prevent scars due to the high frequency heating from being formed on the outside of the cover 12. For this reason, the sheet 16 does not always need to be applied over the cover 12, as shown in FIG. 2; it may be applied only on portions necessary for avoiding the appearance of scars on the outside of the covers 12.

Figure 1:
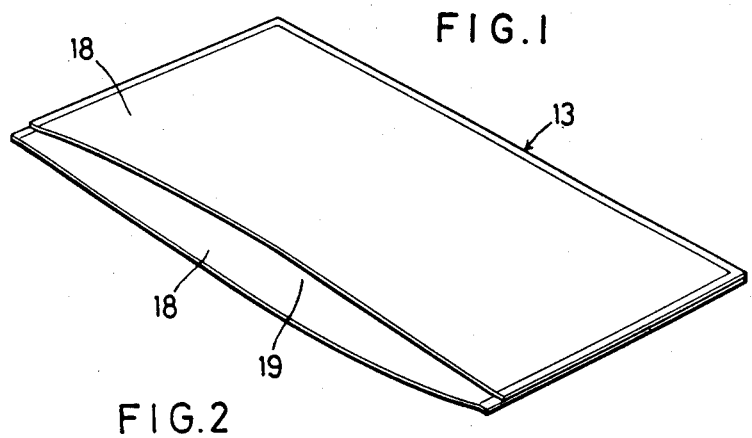
FIG. 1 is a perspective view of a component pocket used in the process of this invention.

Each pocket 13 is formed by two rectangular sheets 18 of thermofusible synthetic polymer with their three edges fused together and one side 19 left open so that an article can be put in it, as shown in FIG. 1.

Figure 4:
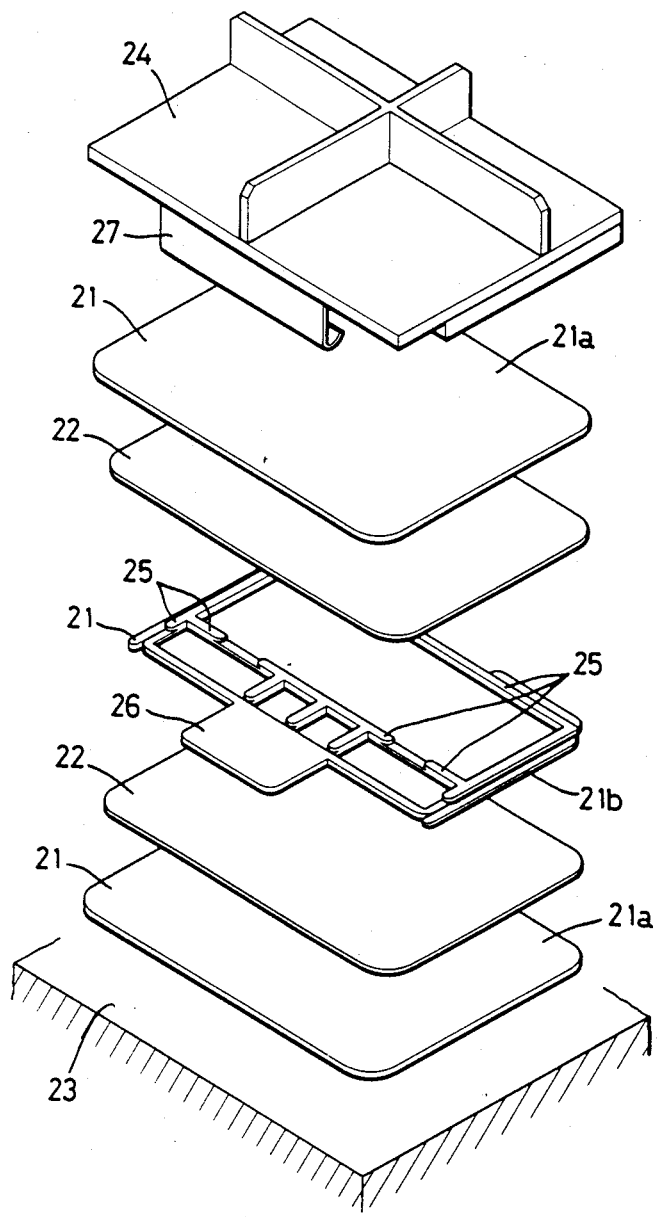
FIG. 4 is an exploded perspective view of a high frequency heating apparatus.

As shown in FIG. 4, a high frequency induction heating apparatus for fusing the covers 12 and the pockets 13 is constructed of electroconductive plates 21 to be put in and taken out of the pocket 17 of the covers 12 and pockets 13, non-electroconductive plates 22 to be put in and taken out of the pocket 13, a bed 23 forming one of the paired electrodes of the high frequency heating apparatus, and a compressing plate 24 forming the other paired electrodes.

The electroconductive plates 21 to be inserted in the pocket 17 have rectangular and flat faces. There are two types of electroconductive plates 21 to be inserted in the pockets 13: one plate 21a which is a simple flat plate and the other plate 21b provided with salient ridge portions 25. The flat electroconductive plate 21a is a little larger than the corresponding pocket 13 so that a part thereof projects out of that pocket 13, by which removal of an article from the pocket 13 is facilitated. The electroconductive plates 21b with the ridge portions 25 are the same size as the pocket 13, but are provided with a projection 26 on one side so that they can be put in or taken out of the pocket 13 by using the projection 26.

The non-electroconductive plates 22 are used for preventing the synthetic polymer sheets 18 from adhering to each other in the individual component pocket 13. For this reason, they can be made of cardboard or epoxy resin, for example, with a size such that a part thereof projects out of the pockets 13.

Figure 13:
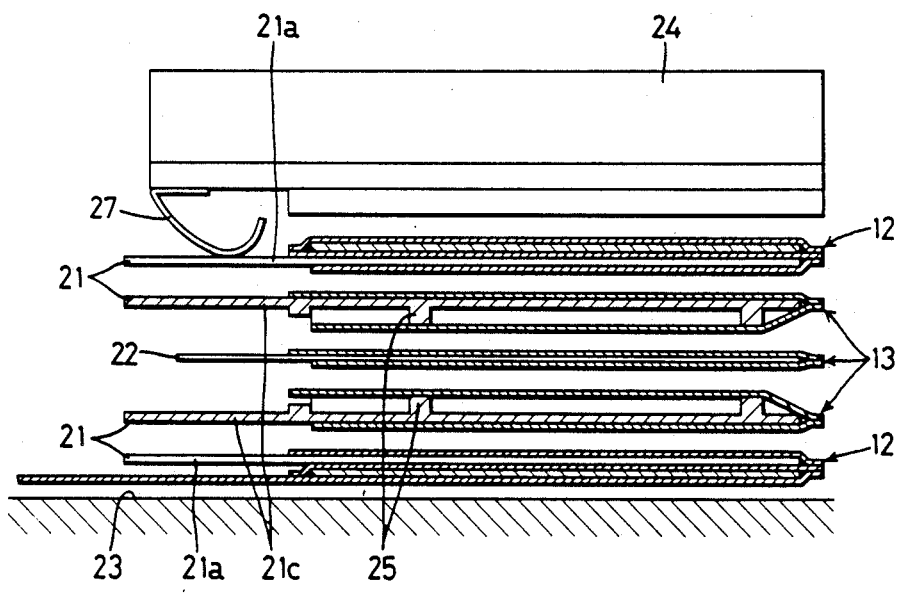

Specifically, the electroconductive plates 21 with the ridge portions 25 can be of two types: one type 21b has ridge portions 25 on both the faces, as shown in FIG. 5, and the other type 21c has ridge portions 25 on one face and is flat on the other, as shown in FIG. 13.

As shown in FIG. 4, the ridge portions 25 are provided along the edge of the electroconductive plates 21b so as to define a fusing pattern.

The first example of the production process for a multi-pocketed paper holder according to this invention will be described in detail with reference to FIGS. 4–6. In the figures, it is shown that three pockets superimposed one on the other are put between a pair of covers 12. As shown in FIG. 5, the flat electroconductive plates 21a are put in the pockets 17 of the respective covers 12. The electroconductive plate 21b with ridge portions 25 on both the faces is put in the middle pocket 13, and the non-electroconductive plates 22 are put in the remaining two pockets 13 on both sides of the middle pocket. The three superimposed pockets are put on one of the covers 12 placed on the bed 23, with the electroconductive plate 21b in the middle pocket; the other of the covers 12 is put on top of the three pockets 13.

In the positioning, the sheet 16, on the back of the covers 12, and the component pocket 13, made out of the sheet 18, have to be in contact with one another; moreover, a part of the electroconductive plate 21a put in the pocket 17 of the covers 12, the projection 26 of the electroconductive plate 21b put in the middle pocket 13, and a part of the non-electroconductive plates 22 put in the pockets 13 have to project from the pockets 17 and 13 on the same side.

The compressing plate 24, which may be raised or lowered by means of an extension or contraction of a cylinder, for example, is lowered and put on the top cover 12 so as to compress the pile of the pockets 13 and the covers 12 together onto the bed 23.

At a certain point during its descent, a tongue 27 on the compressing plate 24 comes into contact with the electroconductive plate 21a, the part of the plate 21 projecting out of the pocket 17 of the top cover 12. High frequency current is applied to the bed 23 and compressing plate 24, and heat is generated in each of the electroconductive plates 21a and 21b by the action of current induced in these plates. By this heat, the synthetic polymer sheets 16 on the backs of the covers 12 and the synthetic polymer sheets 18 of the pockets 13 next to the covers 12 are fused together, and the synthetic polymer sheets 18 of the respective pockets 13 in contact with the other pockets are fused in a pattern corresponding to the ridge portions 25 on the electroconductive plate 21b by the heat and compression.

Figure 6:
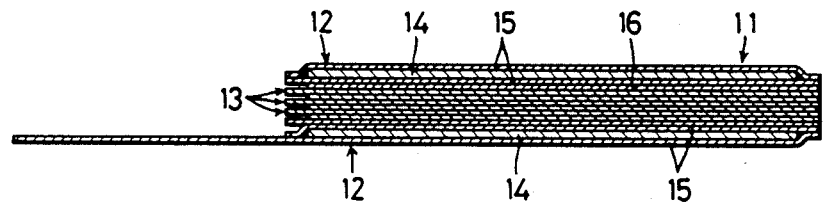
FIG. 6 is a sectional view of a multi-pocketed paper holder produced by the production process shown in FIG. 5.

By withdrawing the electroconductive plates 21a and 21b and the non-electroconductive plates 22 from the pockets 17 and 13, there is left a finished paper holder 11 with three pockets 13 between two covers 12 in the form of bellows, as shown in FIG. 6.

In the first example, a flat electroconductive plate 21a is always put in the pockets 17 of the covers 12, but the electroconductive plates 21b may be put in the middle pocket 13 only, or at least any one of the other pockets 13, and the non-electroconductive plates 22 put in the rest. The insertion of the electroconductive and non-electroconductive plates in the component pockets 13 may be decided at will.

Figure 7:
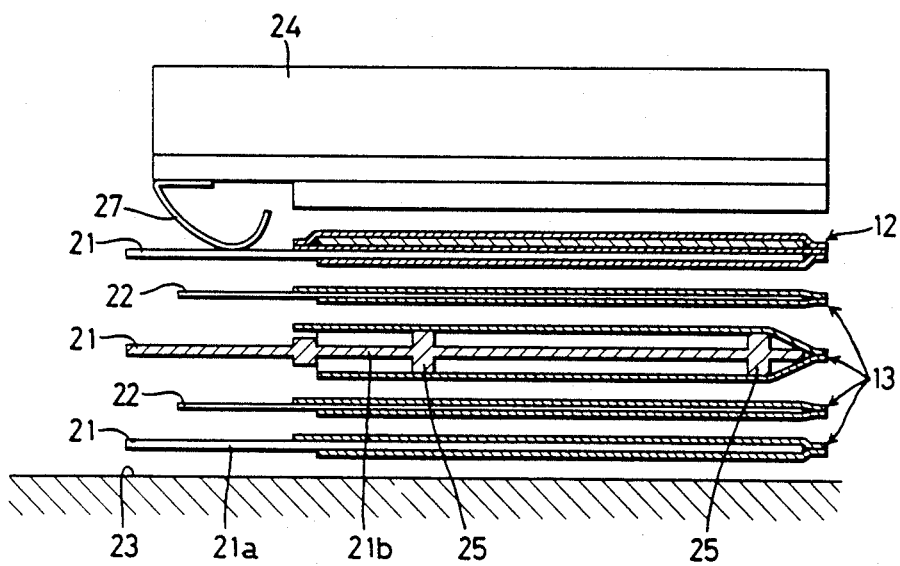
FIGS. 7 and 8 are cross-sectional elevational views illustrating another production process for a multi-pocketed paper holder according to this invention.
Figure 8:
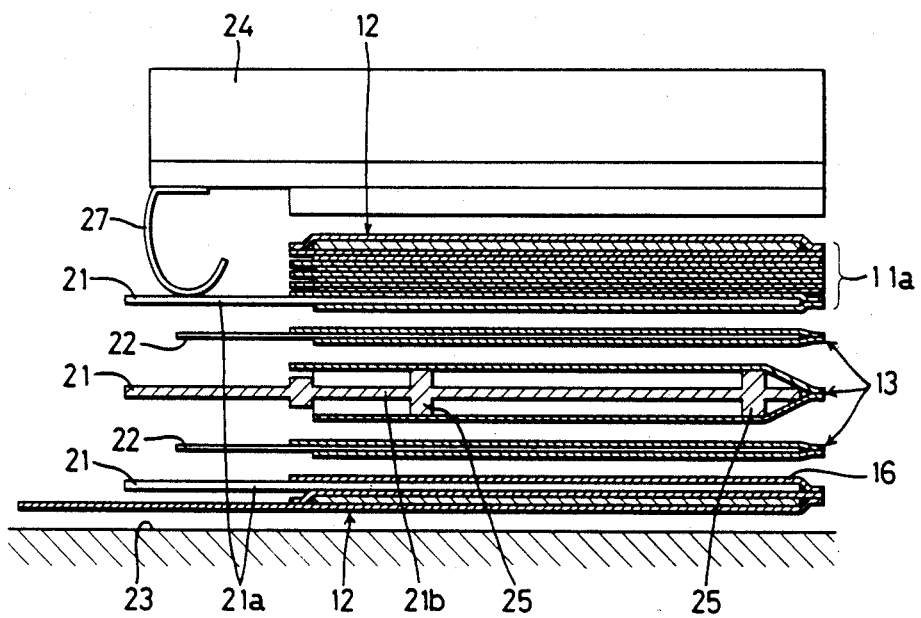
Figure 9:
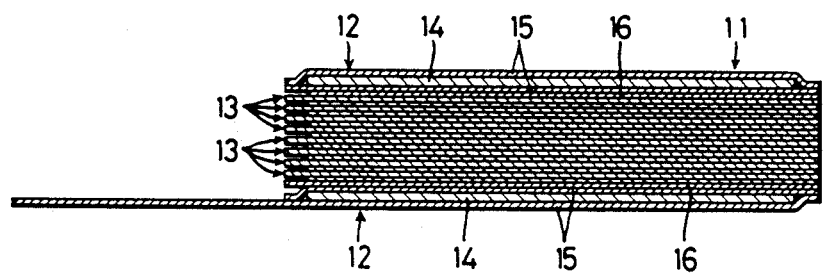
FIG. 9 is a sectional view of a multi-pocketed paper holder produced by the production process shown in FIGS. 7 and 8.

FIGS. 7–9 illustrate a second example of the process for producing a paper holder according to this invention which has seven component pockets 13, more than the one in the first example. As shown in FIG. 7, firstly four pockets 13 are placed on the bed 23, and then a cover 12 is placed on the top. At this time, a flat electroconductive plate 21a is put in the bottom pocket 13. The electroconductive and non-electroconductive plates 21a, 21b and 22 are put in the other pockets 13 and 17 in the same way as in the first example shown in FIG. 5.

A pile of one cover 12 and four pockets 13 is heated by means of the high frequency heating apparatus under compression between the bed 23 and the compressing plate 24 in order to fuse the sheet 16 to the cover 12 with the sheet 18 of the next pocket 13, and the sheets 18 of the pockets 13 in contact one another. After heating, the electroconductive and non-electroconductive plates 21a, 21b and 22 are taken out of the pockets 13 and 17, and there is left a primary half paper holder 11a, which is shown in the upper half of FIG. 8.

Secondly, a cover 12 holding a flat electroconductive plate 21a, a pocket 13 holding a non-electroconductive plate 22, a pocket 13 holding an electroconductive plate 21b with ridge portions 25, and a pocket 13 holding a non-electroconductive plate 22 are piled on the bed 23 in this order from the bottom, and then the primary half paper holder 11a, the bottom pocket of which holds a flat elecroconductive plate 21a, is placed on the top pocket, as shown in FIG. 8. With the descent of the compressing plate 24, heat is generated in the electroconductive plates, which fuses each contacting face between the cover 12 and the pockets 13 and between the contacting pockets 13. FIG. 9 shows a cross-section of a paper holder 11 thus produced.

Figure 10:
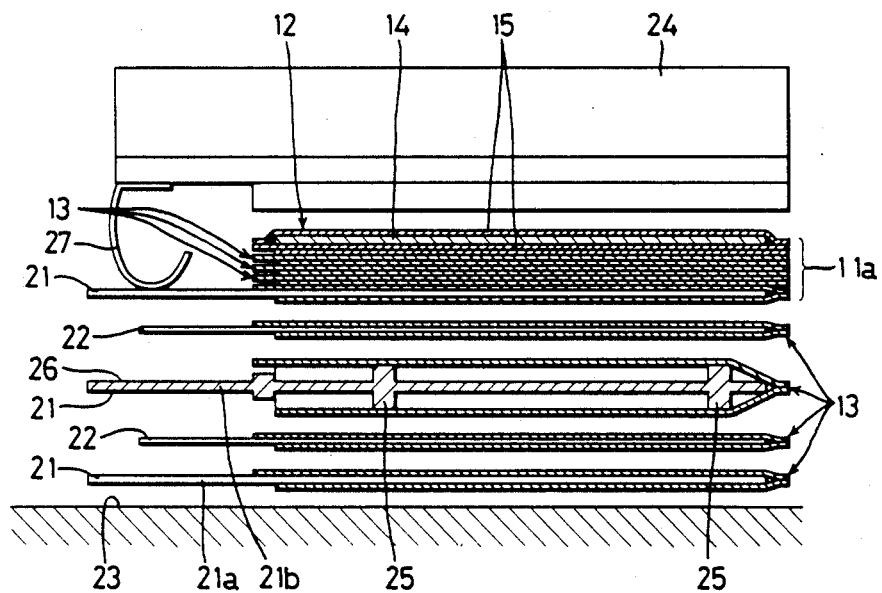
FIGS. 10 and 11 are cross-sectional elevational views illustrating still another production process for a multi-pocketed paper holder according to this invention.
Figure 11:
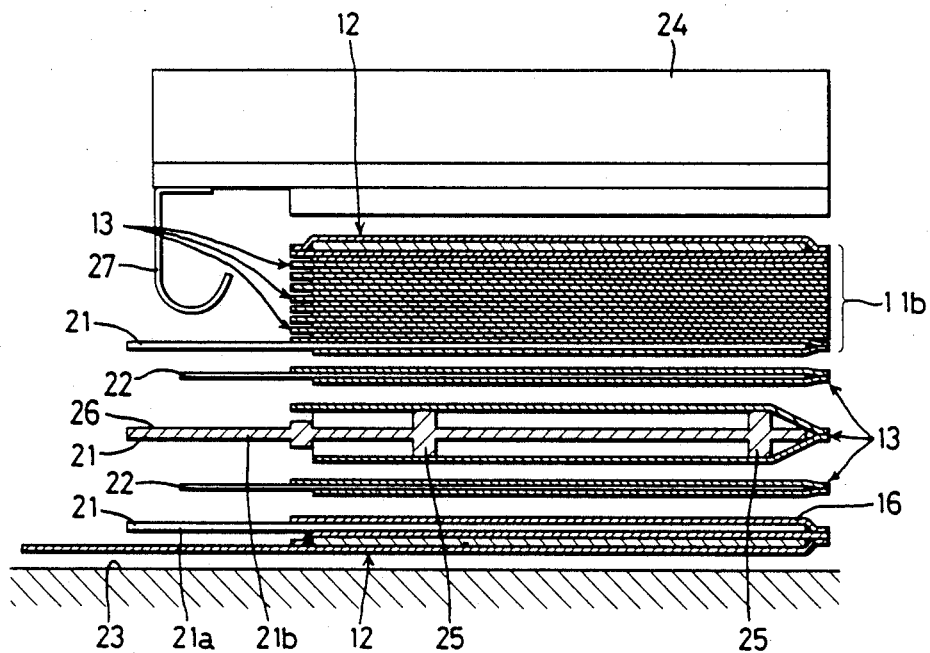

FIGS. 10 and 11 illustrate a third example of the process of producing a paper holder according to this invention. Since the example describes a production process for a paper holder with more pockets than the one in the preceding example, steps in common with those in the preceding example will be omitted.

As apparent from a comparison of FIG. 10 with FIG. 8, in this example, firstly a pocket 13 in which a flat electroconductive plate 21a is placed directly on the bed 23; this is unlike the second step of the second example wherein a cover 12 in which a flat electroconductive plate 21a is placed directly on the bed 23. After three other pockets 13 are placed on the first pocket 13 one by one, a primary half paper holder 11a, comprising four pockets 13 and one cover 12, is placed on top of the pocket pile. A secondary half paper holder 11b, with four more pockets 13 than the primary half paper holder 11a, which is shown in the upper half of FIG. 11, is formed by the high frequency fusing. Secondly, a cover 12 and pocket 13 are put one on another in the same order as in the second step (FIG. 8) of the second example between the base 23 and the secondary half paper holder 11b and fused together, as shown in FIG. 11.

In this way, a finished product with as many pockets 13 as desired between the covers 12 can be produced. As is apparent from the above, the number of component pockets 13 can be increased or decreased by one unit or more, on condition that a pocket 13, holding an electroconductive plate 21b, and a next one, holding a non-electroconductive plate 22, are matched in pairs as a unit.

Figure 12:
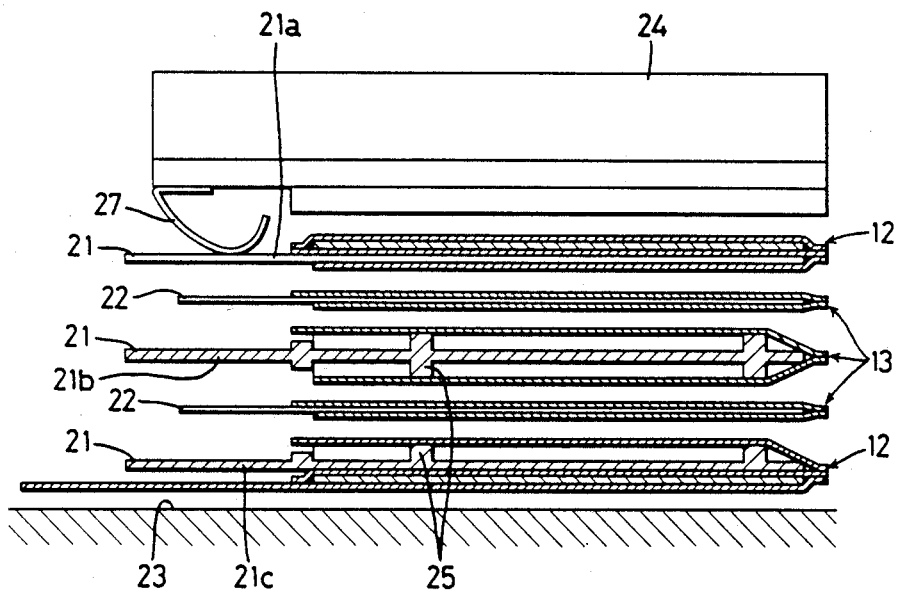
FIGS. 12 and 13 are cross-sectional elevational views illustrating that an electroconductive plate can be used differently in the process of this invention.

FIGS. 12 and 13 are examples showing that the electroconductive plate can be used differently in this invention. FIG. 12 shows that an electroconductive plate 21c with ridge portions 25 on one face can be put in the pocket 17 of a cover 12 and an electroconductive plate 21b with ridge portions 25 on both faces can be put in the nmiddle pocket 13 prior to the high frequency heating. FIG. 13 shows that two electroconductive plates 21c can be put in different pockets 13 respectively so that their ridge portions 25 oppose one another prior to the high frequency heating.

What is claimed is:

1. A production process for a multi-pocketed paper holder, comprising:
   preparing a pair of covers each having a back provided with a pocket made of a synthetic polymer sheet, and a plurality of component pockets each made of synthetic polymer sheets;
   placing a plate of an electroconductive or a non-electroconductive material in each of the component pockets;
   superposing component pockets holding an electroconductive plate and component pockets holding a non-electroconductive plate between said covers to form a pile such that the pockets having electroconductive plates and the pockets having non-electroconductive plates are arranged in alternating sequence;
   compressing the pile of component pockets and covers in the direction of the thickness of the pile between a bed and a compressing plate of a high frequency induction heating apparatus; and
   applying a high frequency electric current to the bed and compressing plate to heat all the electroconductive plates by current flow induced therein for fusing the contacting faces of the pockets.

2. A production process according to claim 1 in which the electroconductive plates in the pockets on the back of the covers are flat on both sides, and the electroconductive plate in at least one of the component pockets has salient ridge portions on at least one face thereof.

3. A production process according to claim 1 in which the electroconductive plate in the pocket of at least one of the covers has salient ridge portions on one face thereof.

4. A production process according to claim 1 in which the electroconductive plates in the pockets in at least two adjacent component pockets have salient ridge portions which oppose each other.

5. A production process according to claim 1 in which the non-electroconductive plates are made of cardboard.

6. A production process according to claim 1 in which the non-electroconductive plates are made of epoxy resin.

7. A production process for a multi-pocketed paper holder, comprising:
   preparing a pair of covers each having a back provided with a pocket made of a synthetic polymer sheet, and a plurality of component pockets each made of synthetic polymer sheets;
   placing a plate of an electroconductive or a non-electroconductive material in each of the component pockets;
   first superposing component pockets holding an electroconductive plate and component pockets holding a non-electroconductive plate on one of said covers to form a first pile such that the pockets having electroconductive plates and the pockets having non-electroconductive plates are arranged in alternating sequence;
   compressing said first pile of component pockets and cover in the direction of the thickness of the pile between a bed and a compressing plate of a high frequency induction heating apparatus;
   applying a high frequency electric current to the bed and compressing plate to heat all the electroconductive plates by current flow induced therein for fusing the contacting faces of the pockets to form a primary paper holder portion;
   then superposing component pockets holding an electroconductive plate and component pockets holding a non-electroconductive plate on the other of said covers to form a second pile such that the pockets having electroconductive plates and the pockets having non-electroconductive plates are arranged in alternating sequence;
   placing an electroconductive plate in the bottom pocket of said primary paper holder portion;
   placing said primary paper holder portion with the one cover on top on the top of said second pile;
   compressing the thus formed pile of the primary holder portion and said second pile in the direction of the thickness thereof between the bed and compressing plate of the high frequency induction heating apparatus; and
   applying a high frequency electric current to the bed and compressing plate to heat all the electroconductive plates by current flow induced therein for fusing the contacting faces of the pockets in the second pile and the bottom pocket of the first pile to form the finished multi-pocketed paper holder.

8. A production process for a multi-pocketed paper holder, comprising:
   preparing a pair of covers each having a back provided with a pocket made of a synthetic polymer sheet, and a plurality of component pockets each made of synthetic polymer sheets;
   placing a plate of an electroconductive or a non-electroconductive material in each of the component pockets;
   first superposing component pockets holding an electroconductive plate and component pockets holding a non-electroconductive plate on one of said covers to form a first pile such that the pockets having electroconductive plates and the pockets having non-electroconductive plates are arranged in alternating sequence;
   compressing said first pile of component pockets and cover in the direction of the thickness of the pile between a bed and a compressing plate of a high frequency induction heating apparatus;
   applying a high frequency electric current to the bed and compressing plate to heat all the electroconductive plates by current flow induced therein for fusing the contacting faces of the pockets to form a primary paper holder portion;
   then superposing component pockets holding an electroconductive plate and component pockets holding a non-electroconductive plate to form a second pile such that the pockets having electroconductive plates and the pockets having non-electroconductive plates are arranged in alternating sequence;

placing an electroconductive plate in the bottom pocket of said primary paper holder portion;

placing said primary paper holder with the one cover on top on the top of said second pile;

compressing the thus formed pile of the primary holder portion and said second pile in the direction of the thickness thereof between the bed and compressing plate of the high frequency induction heating apparatus;

applying a high frequency electric current to the bed and compressing plate to heat all the electroconductive plates by current flow induced therein for fusing the contacting faces of the pockets in the second pile and the bottom pocket of the first pile to form an intermediate paper holder portion;

repeating the steps of forming the second pile and fusing it to the intermediate paper holder portion to form a further intermediate paper holder portion;

then superposing component pockets holding an electroconductive plate and component pockets holding a non-electroconductive plate on the other of said covers to form a third pile such that the pockets having electroconductive plates and the pockets having non-electroconductive plates are arranged in alternating sequence;

placing an electroconductive plate in the bottom pocket of said further intermediate paper holder portion;

placing said further intermediate paper holder portion with the one cover on top on the top of said third pile;

compressing the thus formed pile of the further intermediate paper holder portion and said third pile in the direction of the thickness thereof between the bed and compressing plate of the high frequency induction heating apparatus; and applying a high frequency electric current to the bed and compressing plate to heat all the electroconductive plates by current flow induced therein for fusing the contacting faces of the pockets in the third pile and the bottom pocket of the further intermediate paper holder portion to form the finished multi-pocketed paper holder.

* * * * *